(12) United States Patent
Cho et al.

(10) Patent No.: US 6,654,826 B1
(45) Date of Patent: Nov. 25, 2003

(54) DOCKING SYSTEM FOR A PORTABLE COMPUTER

(75) Inventors: Woo-Jong Cho, Suwon (KR); Hyun-Kuk Shin, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 457 days.

(21) Appl. No.: 09/709,731

(22) Filed: Nov. 13, 2000

(30) Foreign Application Priority Data

Nov. 10, 1999 (KR) ........................................ 1999-49716

(51) Int. Cl.⁷ ........................... G06F 13/00; G06F 9/445
(52) U.S. Cl. ....................... 710/62; 710/104; 710/303; 713/2
(58) Field of Search ................................ 710/303, 304, 710/104, 62, 65, 64, 69, 70, 71; 361/686, 683; 713/2, 1, 100

(56) References Cited

U.S. PATENT DOCUMENTS

| | | | | |
|---|---|---|---|---|
| 5,664,118 A | * | 9/1997 | Nishigaki et al. ........... 710/304 |
| 5,864,708 A | * | 1/1999 | Croft et al. .................... 710/62 |
| 5,884,049 A | * | 3/1999 | Atkinson .................... 710/303 |
| 6,070,214 A | * | 5/2000 | Ahern ......................... 710/315 |
| 6,088,794 A | * | 7/2000 | Yoon et al. ..................... 713/2 |
| 6,195,370 B1 | * | 2/2001 | Haneda et al. ........... 372/29.01 |
| 6,438,622 B1 | * | 8/2002 | Haghighi et al. .............. 710/1 |

* cited by examiner

*Primary Examiner*—Kim Huynh
(74) *Attorney, Agent, or Firm*—Robert E. Bushnell, Esq.

(57) ABSTRACT

In a docking system for a portable computer, the bus sharing structure between the portable computer and a docking station and the structure of the docking station are improved so that the real time execution of a program and the sharing of data and peripheral devices are possible. The docking system of the portable computer includes: a docking station including an auxiliary storage device wherein a first operating system is stored, I/O devices, a plurality of extension slots and a plurality of ports, but excluding a microprocessor and a memory; a portable computer including a ROM wherein a second operating system is stored, a microprocessor, a memory wherein commands and data are stored in an electronic manner, and a docking controller for selecting one of the first and second operating systems according to whether or not the portable computer is docked at the docking station; and first and second signal transmitting units provided at the portable computer and the docking station, respectively, for performing transmission and reception of data between the portable computer and the docking station.

18 Claims, 4 Drawing Sheets

DOCKING SYSTEM FOR A PORTABLE COMPUTER

CLAIM OF PRIORITY

This application makes reference to, incorporates the same herein, and claims all benefits accruing under 35 U.S.C. §119 from my application DOCKING SYSTEM OF PORTABLE COMPUTER filed with the Korean Industrial Property Office on Nov. 10, 1999 and there duly assigned Serial No. 49716/1999.

BACKGROUND OF THE INVENTION

1. Field of the Invention

The present invention relates to a docking system for a portable computer and, more particularly, to a docking system for a portable computer having an improved bus sharing structure between the portable computer and the docking station so that a program can be executed in real time and data and peripheral devices can be shared.

2. Description of the Related Art

In general, a portable computer has a reduced number of functions and is made to be easy to carry compared to a desk top computer. Within the class of portable computers, there are notebook computers, personal digital assistants (PDAs), and handheld personal computers (HPCs).

A typical PDA includes a microprocessor and a memory, such as a random access memory (RAM) and a read-only memory (ROM), for storing and processing information, and the information is input through a touch screen. The PDA uses an information storage device, such as a flash memory, instead of auxiliary storage, such as a hard disk drive (HDD). The information storage device is small and does not require an additional driving apparatus.

A typical HPC is provided with a personal information management system (PIMS), as well as a word processor or a communications program. The HPC is usually used to assist a desk top PC or a notebook computer.

The PDA and HPC having the above structures are used by being connected to a desk top PC or a notebook computer via a serial port or an infrared ray port.

As shown in FIG. 1, a docking system for a conventional portable computer includes a portable computer 10, such as a typical PDA or HPC, and a desk top computer 20 at which the portable computer 10 is docked. Referring to the drawing, the portable computer 10 is small and includes a microprocessor 11, such as a CPU, and a memory, such as RAM 12 and ROM 13, for processing and storing information, a touch screen 14 for inputting information, and an LCD device 16 for displaying information. The portable computer 10 also includes a port I 15 for the connection to a desk top computer 20, which will be described later, and which may be either a serial port or an infrared ray port. A flash memory 17 and buffer 18 are also provided.

The desk top computer 20, which has high performance and multiple functions, includes auxiliary storage devices such as a hard disk drive (HDD) 21 or a CD-ROM 22, various extension slots, and ports, in addition to a microprocessor 23 and a memory 24. The desk top computer 20 also includes a port II 25 connected to port I 15. Other components are ROM 24a, AGP 24b, AL BUS FOR VGA 24c, DMA 26a, I/O port 26b, timer 26c, PIC 26d, keyboard 26e, SCSI 27, and buffers 28a, 28b and 29.

In this docking system, each of the portable computer 10 and the desk top computer 20 has a separate microprocessor, thus forming independent systems. By electrically connecting the port I 15 and the port II 25 in series, data is not transmitted therebetween in a real time manner.

In the docking system for the conventional portable computer having the above structure, because the portable computer 10 and the desk top computer 20 are operated separately, it is a drawback that only data transmission is possible between the computers 10 and 20. Also, since data cannot be transmitted in real time, a program cannot be executed in real time. Thus, it is inconvenient that communication between the computers 10 and 20 is only accomplished by means of downloading.

Also, only a limited amount of work is possible when a program of the portable computer 10 is executed since such resources as the HDD 21 and I/O (input/output) devices, memory or ports of the desk top computer 20 cannot be used. The portable computer 10 uses software stored in the ROM 24a, and the number of software programs available is limited when the portable computer 10 is purchased. Thus, a particular application performed on the desk top computer 20 which has improved performance may not be executed on the portable computer 10. Also, since the microprocessors 11 and 23 of the portable computer 10 and the desk top computer 20, respectively, are different from each other, compatibility is lowered. Furthermore, the function of the portable computer 10 is limited as to upgrading, and even when the performance of extension units, such as a video card, a sound card, a LAN card or an I/O device of the desk top computer 20, is improved, the improved extension units cannot be used.

SUMMARY OF THE INVENTION

To solve the above problems, it is an objective of the present invention to provide a docking system for a portable computer in which the bus sharing structure between the portable computer and a docking station and the structure of the docking station are improved so that the real time execution of a program and the sharing of data and peripheral devices are possible.

Accordingly, to achieve the above objective, there is provided a docking system for a portable computer which comprises: a docking station, including an auxiliary storage device wherein a first operating system is stored, I/O devices, a plurality of extension slots and a plurality of ports, and excluding a microprocessor and a memory; a portable computer including a ROM wherein a second operating system is stored, a microprocessor, a memory wherein commands and data are stored in an electronic method, and a docking controller for selecting one of first and second operating systems according to whether the portable computer is docked at the docking station; and first and second signal transmitting units provided at the portable computer and the docking station, respectively, for performing the transmission and receiving of data between the portable computer and the docking station.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

DETAILED DESCRIPTION OF THE INVENTION

Figure 1:
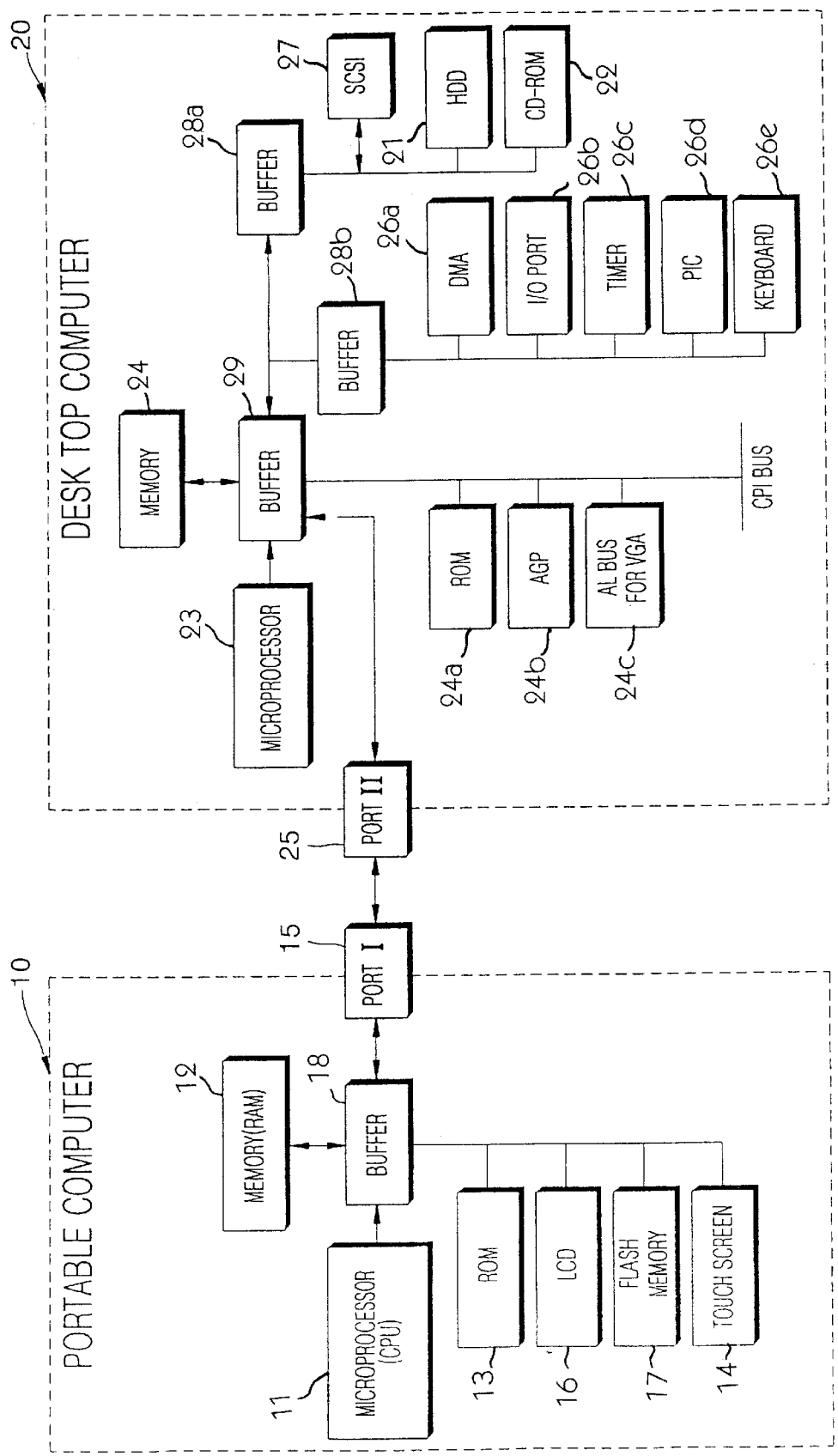
Figure 2:
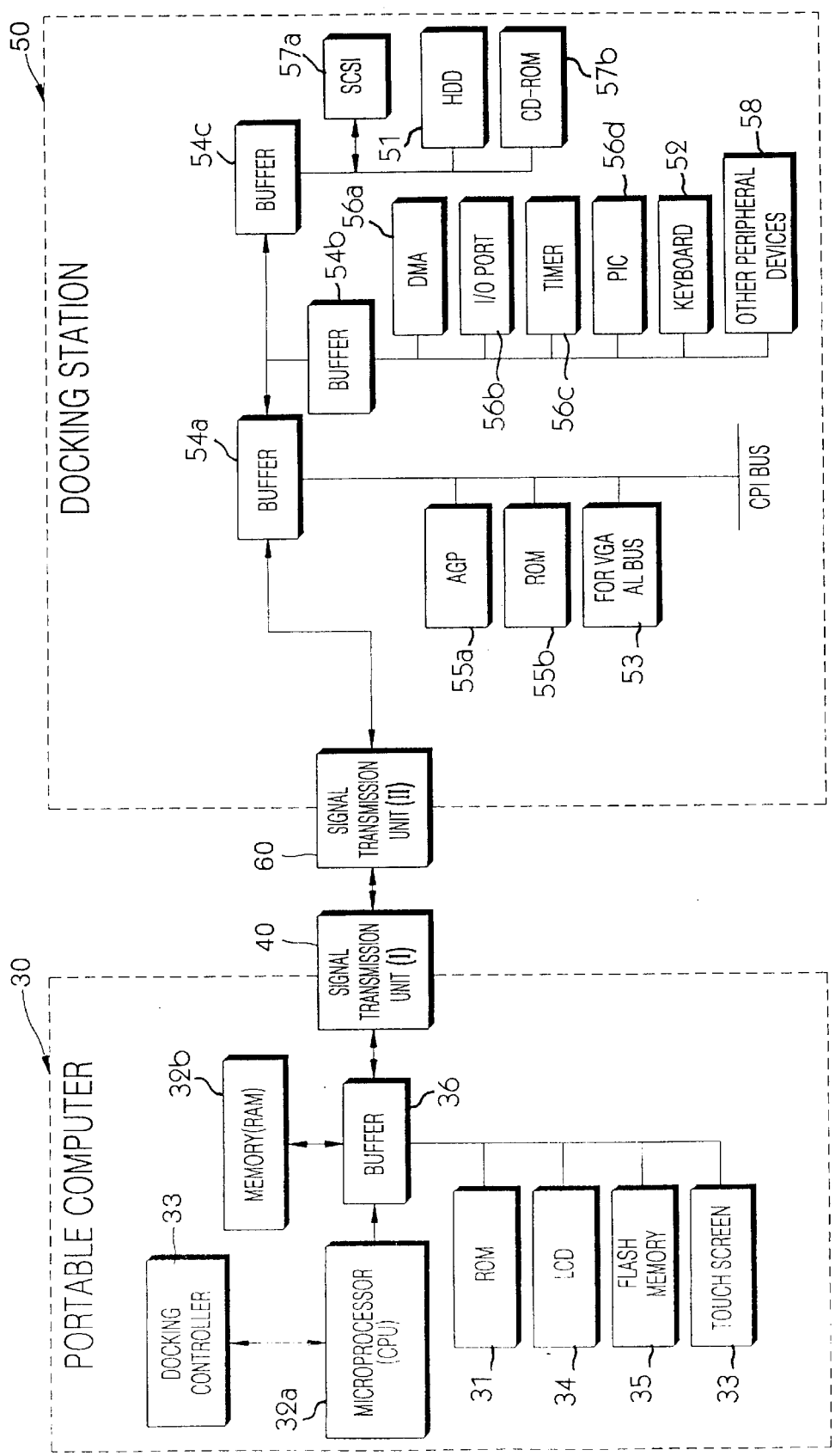

Referring to FIG. 2, a docking system for a portable computer according to the present invention includes: a docking station 50 which is operated according to a first operating system; a portable computer 30 which is independently operated according to a second operating system when not docked, but which is operated according to the first operating system when it is docked at the docking station 50; and first and second signal transmitting units 40 and 60, respectively, provided at the portable computer 30 and the docking station 50, respectively.

The docking station 50 does not have a microprocessor and a memory as in a typical desk top computer, so that independent operation thereof is not possible. The docking station 50 includes: an auxiliary storage device, such as an HDD 51, wherein the first operating system is stored; I/O devices such as a mouse (not shown), a keyboard 52 and a monitor (not shown); a plurality of extension slots where a graphic card 53, a sound card, a modem and an LAN card (the latter three not shown) are installed; and serial and parallel ports (also not shown). Thus, when the portable computer 30 is docked at the docking station 50 via the first and second signal transmitting units 40 and 60, the performance of the portable computer 30 is improved and multiple functions, such as representation of multimedia, can be performed. The docking station 50 also includes buffers 54a, 54b and 54c, AGP, 55a, ROM 55b, DMA 56a, I/O port 56b, timer 56c, PIC 56d, SCSI 57a, CD-ROM 57b and other peripheral devices 58.

The portable computer 30 is small and is made to be easy to carry, and includes a ROM 31 wherein the second operating system is stored, a microprocessor 32a, a memory 32b wherein commands and data are stored, and a docking controller 33 for controlling the selection of an operating system according to whether or not the portable computer 30 is docked at the docking station 50. Also, the portable computer 30 includes a touch screen 33 for inputting information, and an LCD 34 for displaying information, as well as flash memory 35 and buffer 36. The microprocessor 32a and memory 32b of the portable computer 30 are continuously used after the portable computer 30 is docked at the docking station 50, so that real time data processing is performed between the portable computer 30 and the docking station 50.

When the portable computer 30 is operated in a manner independent of the docking station 50, the docking controller 33 of the portable computer 30 selects the second operating system stored in the ROM 31 of the portable computer 30. When the portable computer 30 is docked at the docking station 50, the docking controller 33 selects the first operating system. For this function, the docking controller 33 detects a docking state between the first and second signal transmitting units 40 and 60, respectively, stores the detected state in flash memory 35, and resets the microprocessor 32a to make the portable computer 30 use the first operating system when the first and second signal transmitting units 40 and 60 are connected.

When the portable computer 30 is rebooted, the microprocessor 32a reads a ROM BIOS program from the ROM 55b in the docking station 50, searches for resources of the docking station 50, and executes the first operating system. Thus, after docking, the operating system of the portable computer 30 is the first operating system, which is the operating system of the docking station 50, rather than the second operating system. Also, general programs can be executed by portable computer 30 using the resources of the docking station 50.

In the docking system having the above structure, real time data transmission and sharing of resources is possible owing to the docking of the portable computer 30 and the docking station 50, and the portable computer 30 can perform applications which need the capability of high performance and multiple functions.

The first and second signal transmitting units 40 and 60, respectively, are provided at the portable computer 30 and the docking station 50, respectively, to perform transmission and reception of data between the portable computer 30 and the docking station 50.

Figure 3:
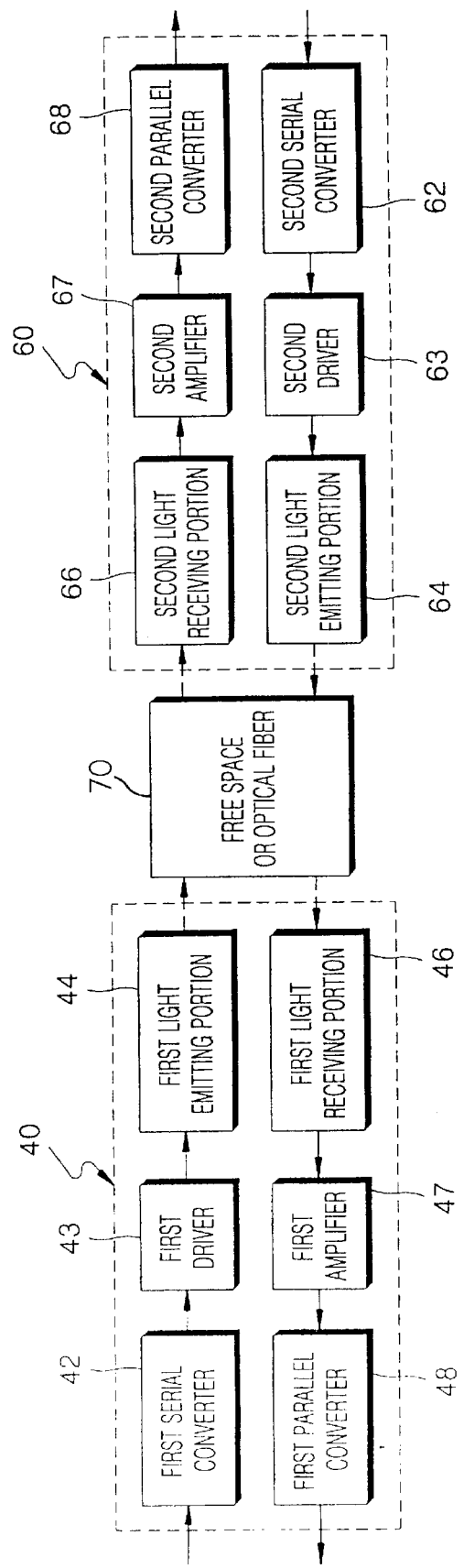

Referring to FIG. 3, according to a preferred embodiment of the present invention, the first and second signal transmitting units 40 and 60, respectively, are configured to be able to convert an input electric signal to an optical signal and to transmit the converted signal to each other.

The first signal transmitting unit 40 includes a first serial converter 42, a first driver 43, a first light emitting portion 44 for converting an input electric information signal to an optical information signal, a first light receiving portion 46, a first amplifier 47 and a first parallel converter 48.

The first serial converter 42 receives a parallel transmission signal output from the portable computer 30 and converts the parallel signal to a serial signal. The first driver 43 drives the first light emitting portion 44 according to the signal output from the first serial converter 42. The first light emitting portion 44, which is driven by the first driver 43 to emit light, converts an input electric information signal to an optical information signal, and transmits the converted signal to the second signal transmitting unit 60 via free space or optical fiber 70. The first light emitting portion 44 is, preferably, a semiconductor laser array and, in particular, a vertical cavity surface emitting laser array. The first light receiving portion 46 receives an optical information signal input from the second signal transmitting unit 60 via free space or optical fiber 70, and converts the received signal to an electric information signal. The first amplifier 47 amplifies the converted electric signal. The first parallel converter 48 converts the serial signal amplified by the first amplifier 47 to a parallel signal.

The second signal transmitting unit 60 includes a second serial converter 62, a second driver 63, a second light emitting portion 64 for converting an input electric information signal to an optical information signal, a second light receiving portion 66, a second amplifier 67 and a second parallel converter 68. The second serial converter 62 converts a parallel transmission signal output from the docking station 50 to a serial signal, and transmits the converted signal to the second driver 63. The second light emitting portion 64, which is driven by the second driver 63 to emit light, converts an input electric information signal to an optical information signal, and transmits the converted signal to the first light receiving portion 46 of the first signal transmitting unit 40 via free space or optical fiber 70. The second light receiving portion 66 receives an optical information signal input from the first light emitting portion 44 via free space or optical fiber 70, and converts it to an electric information signal. The second amplifier 67 amplifies the converted electric signal. The amplified serial signal is converted to a parallel signal by the second parallel converter 68.

In this case, the optical signal is transmitted via the free space or optical fiber 70 between the first and second signal transmitting units 40 and 60, respectively, that is, between the first light emitting portion 44 and the second light receiving portion 66, and between the second light emitting portion 64 and the first light receiving portion 46.

Furthermore, each of the transmission signals inputted to the first and second serial converters 42 and 62, respectively, is analyzed, classified, error-corrected, encoded and signal-synchronized by a pre-processor (not shown) so that the transmission signal is modified so as to be suitable for a desired protocol. Also, each of the received signals outputted from the first and second parallel converters 48 and 68, respectively, is error-corrected and signal-synchronized by a post-processor (not shown) so that the received signals are classified into a control signal and a data signal, and are converted to be the same as the original transmission signal.

Figure 4:
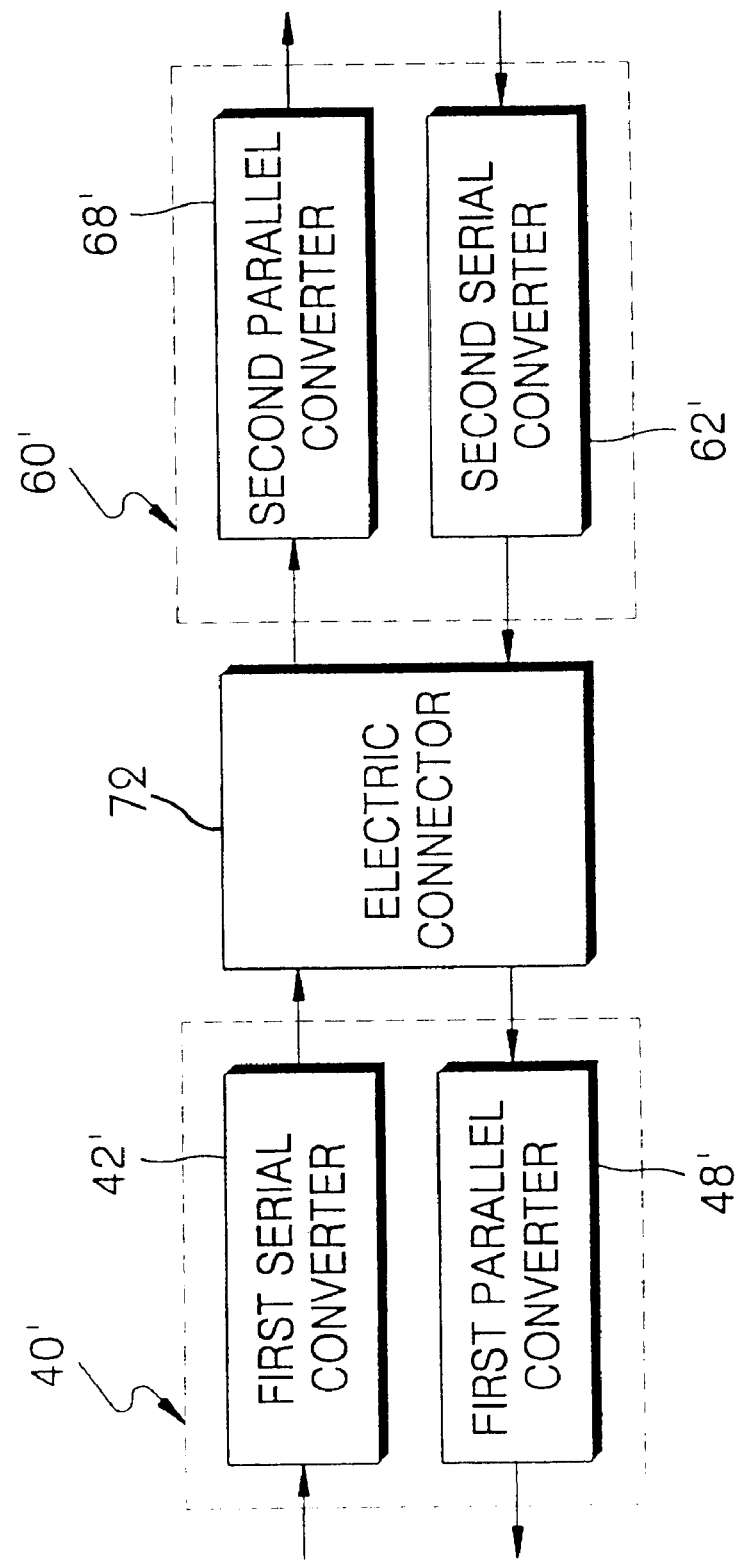

Referring to FIG. 4, first and second signal transmitting units 40' and 60', respectively, have electric connection structures. That is, the first signal transmitting unit 40' includes: a first serial converter 42' for receiving a parallel transmission signal output from the portable computer 30, and for converting the parallel signal to a serial signal for transmission to second signal transmitting unit 60' via electric connector 72; and a first parallel converter 48' for converting the serial signal output received from the second signal transmitting unit 60' via electric connector 72 to a parallel signal.

The second signal transmitting unit 60' includes: a second serial converter 62' for receiving a parallel transmission signal output from the docking station 50 and converting the parallel signal to a serial signal for transmission to first signal transmission unit 40' via electric connector 72; and a second parallel converter 68' for converting the serial signal output from the first signal transmitting unit 42' to a parallel signal.

Preferably, each of the first and second signal transmitting units 40' and 60', respectively, further includes a pre-processor (not shown) and a post-processor (not shown) for performing error-correction and signal-synchronization.

As described above, in the docking system of the portable computer according to the present invention, since the portable computer 30 initiates performance of an application, real time data transmission and real time program execution between the portable computer 30 and the docking station 50 are possible. Also, when the portable computer 30 is docked at the docking station 50, the resources of the docking station 50, such as the HDD 51, I/O devices, the memory 55b, or the ports can be used during the execution of a program on the portable computer 30. Thus, when the performance of the docking station 50 is improved, the performance of the portable computer 30 is also improved when it is docked at the docking station 50.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A docking system for a portable computer, comprising:
    a docking station including an auxiliary storage device wherein a first operating system is stored, I/O devices, a plurality of extension slots and a plurality of ports, and excluding a microprocessor and a memory;
    a portable computer including a read-only memory (ROM) wherein a second operating system is stored, a microprocessor, a memory wherein commands and data are stored, and a docking controller for selecting one of the first and second operating systems according to whether the portable computer is docked at the docking station; and
    first and second signal transmitting units provided at the portable computer and the docking station, respectively, for performing transmission and reception of data between the portable computer and the docking station.

2. The docking system as claimed in claim 1, wherein the docking controller detects a docking state between the first signal transmitting unit and the second signal transmitting unit, stores the detected state in the memory, and resets the microprocessor to make the portable computer use the first operating system when the first and second signal transmitting units are connected.

3. The docking system as claimed in claim 1, wherein the first signal transmitting unit comprises:
    a first light emitting portion for converting a first input electric information signal to a first optical information signal, and for transmitting the first optical information signal to the second signal transmitting unit as emitted light;
    a first driver for driving the first light emitting portion by receiving a transmission signal output from the portable computer and producing the first input electric information signal;
    a first light receiving portion for receiving a second optical information signal input from the second signal transmitting unit, and for converting the received signal to a first electric information signal; and
    a first amplifier for amplifying the first electric information signal from the first light receiving portion to produce a first signal output; and wherein the second signal transmitting unit comprises:
    a second light emitting portion for converting a second input electric information signal to the second optical information signal, and for transmitting the second optical information signal to the first signal transmitting unit as emitted light;
    a second driver for driving the second light emitting portion by receiving a transmission signal output from the docking station and producing the second input electric information signal;
    a second light receiving portion for receiving the first optical information signal input from the first signal transmitting unit, and for converting the received signal to a second electric information signal; and
    a second amplifier for amplifying the second electric information signal from the second light receiving portion to produce a second signal output.

4. The docking system as claimed in claim 3, wherein optical signals are transmitted between the first and second signal transmitting units via one of a free space and an optical fiber.

5. The docking system as claimed in claim 3, wherein the first signal transmitting unit further comprises:
    a first serial converter connected to an input of the first driver for receiving a parallel transmission signal output from the portable computer, and for converting the received parallel transmission signal output to a first serial signal; and
    a first parallel converter for converting the first signal output of the first amplifier from a serial signal to a parallel signal; and wherein the second signal transmitting unit further comprises:
    a second serial converter connected to an input of the second driver for receiving a parallel transmission signal output from the docking station, and for converting the received parallel transmission signal output to a second serial signal; and a second parallel converter for converting the second signal output of the second amplifier from a serial signal to a parallel signal.

6. The docking system as claimed in claim 5, wherein optical signals are transmitted between the first and second signal transmitting units via one of a free space and an optical fiber.

7. The docking system as claimed in claim 1, wherein the first signal transmitting unit comprises:
- a first serial converter for receiving a parallel transmission signal output from the portable computer, and for converting the received parallel transmission signal output to a first serial signal; and
- a first parallel converter for converting a second serial signal received from the second signal transmitting unit to a first parallel signal, and wherein the second signal transmitting unit comprises:
- a second serial converter for receiving a parallel transmission signal output from the docking station, and for converting the received parallel transmission signal output to the second serial signal; and
- a second parallel converter for converting the first serial signal received from the first signal transmitting unit to a second parallel signal.

8. The docking system as claimed in claim 7, wherein signals are transmitted between the first and second signal transmitting units via an electrical connector.

9. The docking system as claimed in claim 1, wherein signals are transmitted between the first and second signal transmitting units via one of a free space, an optical fiber, and an electrical connector.

10. A docking system for a portable computer, comprising:
- a docking station including first storage means for storing a first operating system;
- a portable computer including second storage means for storing a second operating system, and a docking controller for selecting the first operating system for use by the portable computer when the portable computer is docked at the docking station, and for selecting the second operating system for use by the portable computer when the portable computer is not docked at the docking station; and
- first and second signal transmitting units provided at the portable computer and the docking station, respectively, for performing transmission and reception of data between the portable computer and the docking station.

11. The docking system as claimed in claim 10, wherein the docking controller detects a docking state between the first signal transmitting unit and the second signal transmitting unit, stores the detected state, sets the portable computer to use the first operating system when the first and second signal transmitting units are connected, and sets the portable computer to use the second operating system when the first and second signal transmitting units are not connected.

12. The docking system as claimed in claim 10, wherein the first signal transmitting unit comprises:
- a first light emitting portion for converting a first input electric information signal to a first optical information signal, and for transmitting the first optical information signal to the second signal transmitting unit as emitted light;
- a first driver for driving the first light emitting portion by receiving a transmission signal output from the portable computer and producing the first input electric information signal;
- a first light receiving portion for receiving a second optical information signal input from the second signal transmitting unit, and for converting the received signal to a first electric information signal; and
- a first amplifier for amplifying the first electric information signal from the first light receiving portion to produce a first signal output; and wherein the second signal transmitting unit comprises:
- a second light emitting portion for converting a second input electric information signal to the second optical information signal, and for transmitting the second optical information signal to the first signal transmitting unit as emitted light;
- a second driver for driving the second light emitting portion by receiving a transmission signal output from the docking station and producing the second input electric information signal;
- a second light receiving portion for receiving the first optical information signal input from the first signal transmitting unit, and for converting the received signal to a second electric information signal; and
- a second amplifier for amplifying the second electric information signal from the second light receiving portion to produce a second signal output.

13. The docking system as claimed in claim 12, wherein optical signals are transmitted between the first and second signal transmitting units via one of a free space and an optical fiber.

14. The docking system as claimed in claim 12, wherein the first signal transmitting unit further comprises:
- a first serial converter connected to an input of the first driver for receiving a parallel transmission signal output from the portable computer, and for converting the received parallel transmission signal output to a first serial signal; and
- a first parallel converter for converting the first signal output of the first amplifier from a serial signal to a parallel signal; and wherein the second signal transmitting unit further comprises:
- a second serial converter connected to an input of the second driver for receiving a parallel transmission signal output from the docking station, and for converting the received parallel transmission signal output to a second serial signal; and
- a second parallel converter for converting the second signal output of the second amplifier from a serial signal to a parallel signal.

15. The docking system as claimed in claim 14, wherein optical signals are transmitted between the first and second signal transmitting units via one of a free space and an optical fiber.

16. The docking system as claimed in claim 10, wherein the first signal transmitting unit comprises:
- a first serial converter for receiving a parallel transmission signal output from the portable computer, and for converting the received parallel transmission signal output to a first serial signal; and
- a first parallel converter for converting a second serial signal input received from the second signal transmitting unit to a first parallel signal, and wherein the second signal transmitting unit comprises:
- a second serial converter for receiving a parallel transmission signal output from the docking station, and for converting the received parallel transmission signal output to the second serial signal; and a second parallel converter for converting the first serial signal received from the first signal transmitting unit to a second parallel signal.

17. The docking system as claimed in claim 16, wherein signals are transmitted between the first and second signal transmitting units via an electrical connector.

18. The docking system as claimed in claim 10, wherein signals are transmitted between the first and second signal transmitting units via one of a free space, an optical fiber and an electrical connector.

* * * * *